United States Patent
Rachabathuni

(10) Patent No.: US 9,043,414 B1
(45) Date of Patent: May 26, 2015

(54) GEO-DYNAMIC EMAIL LISTS

(75) Inventor: Sailesh Rachabathuni, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 277 days.

(21) Appl. No.: 13/324,934

(22) Filed: Dec. 13, 2011

(51) Int. Cl.
*G06F 15/16* (2006.01)
*H04L 29/06* (2006.01)

(52) U.S. Cl.
CPC ...................................... *H04L 29/06* (2013.01)

(58) Field of Classification Search
USPC .................. 709/206, 204, 207; 715/752, 753; 370/260
See application file for complete search history.

(56) References Cited

U.S. PATENT DOCUMENTS

| | | | | |
|---|---|---|---|---|
| 5,990,886 A * | 11/1999 | Serdy et al. | ................... | 715/752 |
| 6,188,315 B1 * | 2/2001 | Herbert et al. | ................ | 340/438 |
| 6,859,791 B1 * | 2/2005 | Spagna et al. | .................. | 705/51 |
| 7,136,915 B2 * | 11/2006 | Rieger, III | ..................... | 709/223 |
| 7,536,695 B2 * | 5/2009 | Alam et al. | .................... | 719/313 |
| 7,734,696 B2 * | 6/2010 | Osterberg et al. | ............. | 709/206 |
| 8,270,933 B2 * | 9/2012 | Riemer et al. | ................. | 455/345 |
| 8,315,905 B1 * | 11/2012 | Adair | ......................... | 705/14.63 |
| 8,510,472 B1 * | 8/2013 | Anderson et al. | ............. | 709/245 |
| 2004/0198344 A1 * | 10/2004 | Pitt et al. | ..................... | 455/426.1 |
| 2005/0078612 A1 * | 4/2005 | Lang | ............... | 370/260 |
| 2008/0032666 A1 * | 2/2008 | Hughes et al. | ............. | 455/404.1 |
| 2008/0046525 A1 * | 2/2008 | Ito et al. | ........................ | 709/206 |
| 2008/0133342 A1 * | 6/2008 | Criou et al. | ...................... | 705/14 |
| 2008/0148276 A1 * | 6/2008 | Kerr et al. | ...................... | 719/313 |
| 2009/0215469 A1 * | 8/2009 | Fisher et al. | ................ | 455/456.3 |
| 2009/0221279 A1 * | 9/2009 | Rutledge | ........................ | 455/418 |
| 2010/0008377 A1 * | 1/2010 | Hasti et al. | ..................... | 370/412 |
| 2010/0036912 A1 * | 2/2010 | Rao | .................................. | 709/204 |
| 2010/0287249 A1 * | 11/2010 | Yigang et al. | ................. | 709/206 |
| 2011/0009107 A1 * | 1/2011 | Guba et al. | ..................... | 455/418 |
| 2011/0264246 A1 * | 10/2011 | Pantoja et al. | ................... | 700/92 |
| 2012/0226757 A1 * | 9/2012 | McFarland et al. | ............ | 709/206 |
| 2012/0293320 A1 * | 11/2012 | Lee et al. | ....................... | 340/522 |
| 2013/0074194 A1 * | 3/2013 | White et al. | ..................... | 726/28 |
| 2013/0086161 A1 * | 4/2013 | Avrahami et al. | ............. | 709/204 |
| 2013/0095865 A1 * | 4/2013 | Roets | ............................ | 455/466 |
| 2013/0110948 A1 * | 5/2013 | Davis et al. | .................... | 709/206 |

* cited by examiner

*Primary Examiner* — Douglas Blair
*Assistant Examiner* — Benjamin Ailes
(74) *Attorney, Agent, or Firm* — Lowenstein Sandler LLP

(57) ABSTRACT

A server computing device receives location data for a user. The server computing device determines a location of the user based on the location data. The server computing device then transmits emails addressed to an email list to an email address for the user based on determining that the location of the user device is associated with the email list.

22 Claims, 9 Drawing Sheets

GEO-DYNAMIC EMAIL LISTS

BACKGROUND OF THE INVENTION

Electronic mail (commonly referred to as email) is frequently used by businesses and by individuals. Commonly, email servers manage the receipt, storage and delivery of email messages. Email messages can be sent from one individual to one or multiple additional individuals. One tool to simplify the sending of an email message to multiple individuals is an email list (also referred to as a mailing list). Email lists may be based on groups, interests, responsibilities, location, etc. When an email server receives an email that is addressed to an email list, the email server may deliver that email message to each of the individuals on the email list.

Conventional email lists are static lists. For these lists to change, an administrator typically needs to manually modify the email list by adding or subtracting entries from the email list. However, this can be a cumbersome process, and causes email lists to frequently not be up to date.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for generating, maintaining and using geo-dynamic email lists are described. In general, a geo-dynamic email list or geo-dynamic mailing list is a list of email addresses and/or recipients whose membership changes based on, for example, locations of users. Accordingly, users may be added to a geo-dynamic email list when they enter a specific location, and may be removed from a geo-dynamic email list when the leave a specific location. Such geo-dynamic email lists can automatically add and remove email addresses for users based on location data without user input. Alternatively, rather than changing membership of a geo-dynamic email list (e.g., adding or removing emails for users from the list), such geo-dynamic email lists may determine which members (e.g., users) of the geo-dynamic email list to send emails to based on locations of those members. Accordingly, geo-dynamic email lists can reduce a burden on an administrator by minimizing interaction with the administrator, and can enable email lists to be provided that are continuously up-to-date.

In one embodiment, a server computing device generates a dynamic email list for a location. The server computing device receives location data for one or multiple users. The location data may be received from mobile devices carried by the users, from a security badge system, from a travel booking system, and/or from other sources. The server computing device identifies users who are at the location based on the location data, and may add email addresses for the identified users to the dynamic email list. In response to receiving an email message that is addressed to the dynamic email list, the server computing device transmits the email message users at the location (e.g., to the identified users whose email addresses are included in the dynamic email list).

In another embodiment, a server computing device receives location data for a user. The server computing device determines a location of the user based on the location data. The server computing device may then remove an email address for the user from a first dynamic email list not associated with the location and/or add the email address for the user to a second dynamic email list associated with the location. In response to receiving an email message addressed to the second dynamic email list, the server computing device sends the email message to the email address of the user if the user's location is associated with the second dynamic email list.

Figure 1:
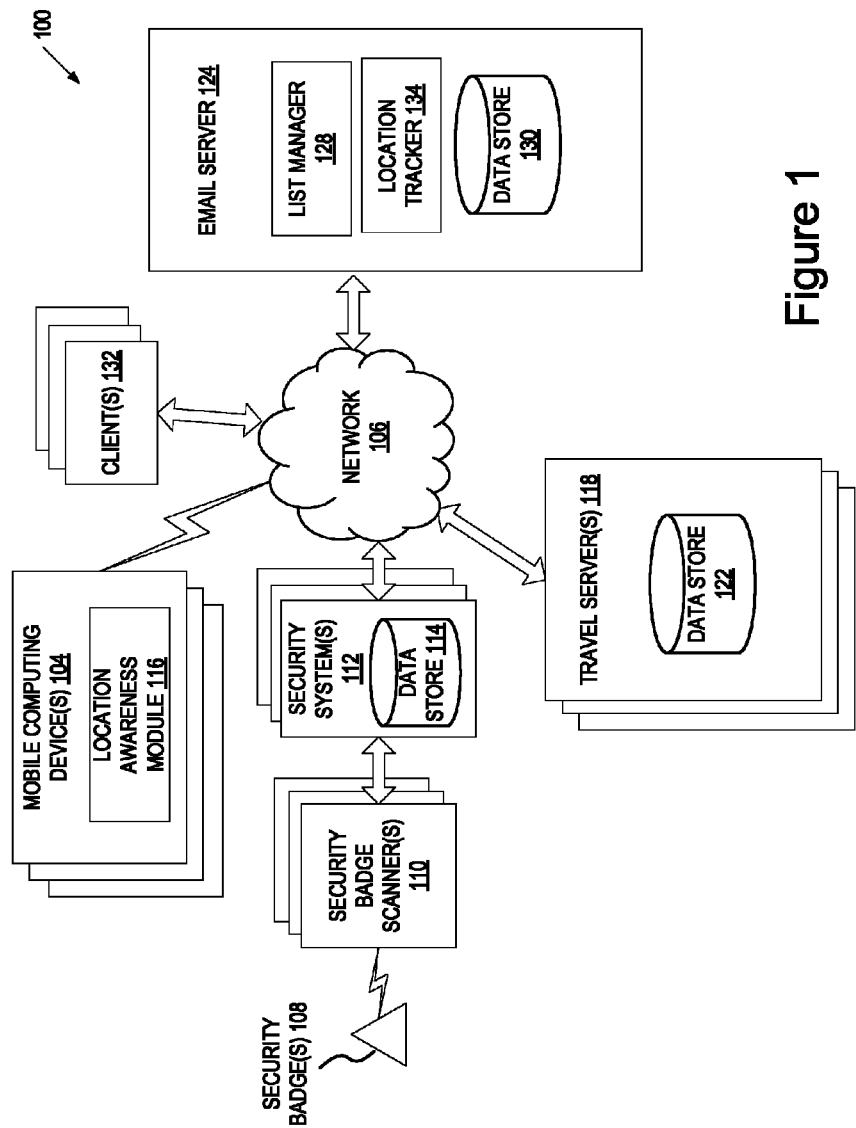
FIG. 1 is a block diagram of an exemplary network architecture, in accordance with one embodiment of the present invention.

FIG. 1 is a block diagram of an exemplary network architecture 100, in which embodiments described herein may operate. The network architecture 100 may include an email server 124 connected to one or more mobile computing devices 104, security systems 112, travel servers 118 and/or clients 132 via a network 106. Network 106 may be a public network such as the Internet, a private network such as a local area network (LAN) or wide area network (WAN), or a combination thereof.

Email server 124 provides network-accessible server-based functionality for managing the receipt, storage, delivery, etc. of email messages. Email server 124 may be implemented by a single server machine or a cluster of machines, each of which may have various data stores 130, and/or other data processing equipment. Email server 124 may include one or more machines (e.g., one or more server computer systems, routers, gateways, etc.) that have processing and storage capabilities to provide the server-based functionality. Additionally, email server 124 may be implemented by a virtual machine.

In one embodiment, email server 124 includes a list manager 128 and a location tracker 134. Location tracker 134 tracks the locations of multiple users associated with email addresses managed by the email server 124. Location tracker 134 may receive location data from multiple sources. Examples of such sources include mobile computing devices 104, security servers 112 and travel servers 118. However, location data may also be received from other sources. For example, location data may be input by a user. Location tracker 134 may use the received data to determine locations of users.

In one embodiment, location tracker 134 receives location reports from users. Location tracker 134 may provide a user with an option, setting or other input mechanism (such as a dropdown menu) to select or input a current location. Location tracker 134 may also prompt the user to input a location. The user may be prompted when certain criteria are satisfied, such as when a predefined amount of time has passed since the user last input their location, when a particular pre-designated time is reached, etc. Alternatively, email server 124 may provide a location setting for users to select.

List manager 128 determines the membership of geo-dynamic email lists based, at least in part, on the user locations identified by location tracker 134. List manager 128 may also use various other input information such as user preferences, directory services information, date and time, email server configuration information, and the like. Email server 124 may include one or multiple geo-dynamic email lists, each of which may be associated with a specific location or locations. As locations of users change, list manager 128 adds email addresses to email lists and removes email addresses from email lists accordingly. In still other implementations, a user's address remains in an email list regardless of the user's location, but list configuration information is changed based on location information. So, for example, email server 124 will examine configuration before selecting which of the email addresses in the list should be used at any given time.

When email server 124 receives an email addressed to a geo-dynamic email list (e.g., from a client 132), email server 124 determines email addresses of users who are at a location associated with the geo-dynamic email list. Email server 124 then delivers the email message to each of those email addresses (e.g., to clients 132 associated with those email addresses). Email server 124 may also store received email messages in data store 130. The stored messages may then later be sent to email addresses of users who enter the location associated with a geo-dynamic email list to which the stored messages are addressed.

Users may carry mobile computing devices 104 with them as they travel or move about. Accordingly, mobile computing devices 104 can be a good source of location data for users. The mobile computing devices 104 may be include any portable computing devices such as electronic book readers, tablet computers, cellular telephones, personal digital assistants (PDAs), portable media players, netbooks, portable game consoles, and the like. Mobile computing devices 104 may be connected to the network 106 wirelessly via any wireless communication systems using any one of multiple wireless protocols. One example of a wireless communication system is a wireless fidelity (WiFi) hotspot connected with the network 106. Another wireless communication system may be a wireless carrier system that can be implemented using various data processing equipment, communication towers, etc. Alternatively, or in addition, the wireless carrier system may rely on satellite technology to exchange information. Examples of wireless protocols that mobile devices 104 may use to establish network connectivity include cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed down-link packet access (HSDPA), long term evolution (LTE), worldwide interoperability for microwave access (WiMax), WiFi, etc.

In one embodiment, the mobile computing devices 104 include location awareness modules 116. A location awareness module 116 gathers information available to the mobile computing device 104 to identify a location of the mobile computing device 104. In one embodiment, location awareness module 116 gathers information that can be used to identify location, and sends the gathered information to email server 124. In another embodiment, location awareness module 116 determines a location of the mobile computing device, and sends the determined location to the email server 124. The location data that location awareness module 116 sends to email server 124 may include a latitude and longitude, a street address, a city, a state, a country, etc. Alternatively, the location data may be used by location tracker 134 to determine location at the level of latitude and longitude, street address, city, state and/or country.

Examples of types of data that location awareness module 116 may collect includes global positioning system (GPS) location data, internet protocol (IP) addresses, cell tower triangulation data, and so forth. For example, the location awareness module 116 may receive global positioning system (GPS) data from a GPS receiver included in the mobile computing device 104. Location awareness module 116 may also perform cell tower triangulation or receive cell tower triangulation data that identifies a location of the mobile computing device 116. Additionally, location awareness module 116 may determine an internet protocol (IP) address that has been assigned to the mobile computing device, and determine a location of the mobile computing device based on the IP address (e.g., by querying an IP to geographic location (GEO) directory server (not shown). The IP to GEO directory server may then identify a geographic location associated with the mobile computing device's IP address, and send a response to the mobile computing device that includes the identified geographic location.

Employees of companies are often issued security badges 108 that can be used to enter company locations such as buildings. Security badges may include badges with bar codes or with radio frequency identifiers (RFIDs). Other types of security badges may also be used. Security badge scanners 110 may be positioned at various locations of a company's campuses (e.g., at entrances) for security purposes. If the security badges 108 include bar codes, then the scanners 110 may be optical scanners. If the security badges 108 include RFIDs, then the scanners 110 may include RFID readers.

When a user wishes to enter a specific location, the user presents his or her security badge to the scanner 110 for scanning (or other type of detection). The security badge scanner 110 may then perform an action such as cause a door to open or unlock, cause a gate to open, etc. Additionally, the security badge scanner 110 may notify a security system 112 of the action performed at the specific location along with the security badge 108 that caused the action to be performed and the time that the action was performed. Accordingly, the security badge scan information can be used to identify a location of a user.

Security system 112 may include a data store 114 in which security scan information is stored. In one embodiment, the data store 114 is a database and security system 112 includes a directory service for accessing the database. In one embodiment, security system 112 connects to email server 124 via network 106, and sends location data updates to the email server 124 based on the stored security scan information. Alternatively, email server 124 may connect to the security system 112 (or systems) to retrieve the location data. For example, email server 124 may connect to security system 112 when an email addressed to a geo-dynamic email list is received. In one embodiment, the security system 112 sends raw security scan information to email server 124, which location tracker 134 may process to determine user locations. Alternatively, security system 112 may determine user locations from the scan information, and send the user locations to email server 124.

Corporate employees may book travel arrangements through company provided resources (e.g., by using a travel agent who works with the company or by using company sponsored travel websites). Travel servers 118 include data stores 122 that may store travel itineraries. Such travel itineraries provide information that can identify where a user will be for set dates. Accordingly, in one embodiment, travel servers 118 may send travel itineraries to email server 124, or may determine user locations from the travel itineraries and report the user locations to email server. If email server 124 receives travel itineraries, then location tracker 134 may determine user locations based on those travel itineraries.

Figure 2:
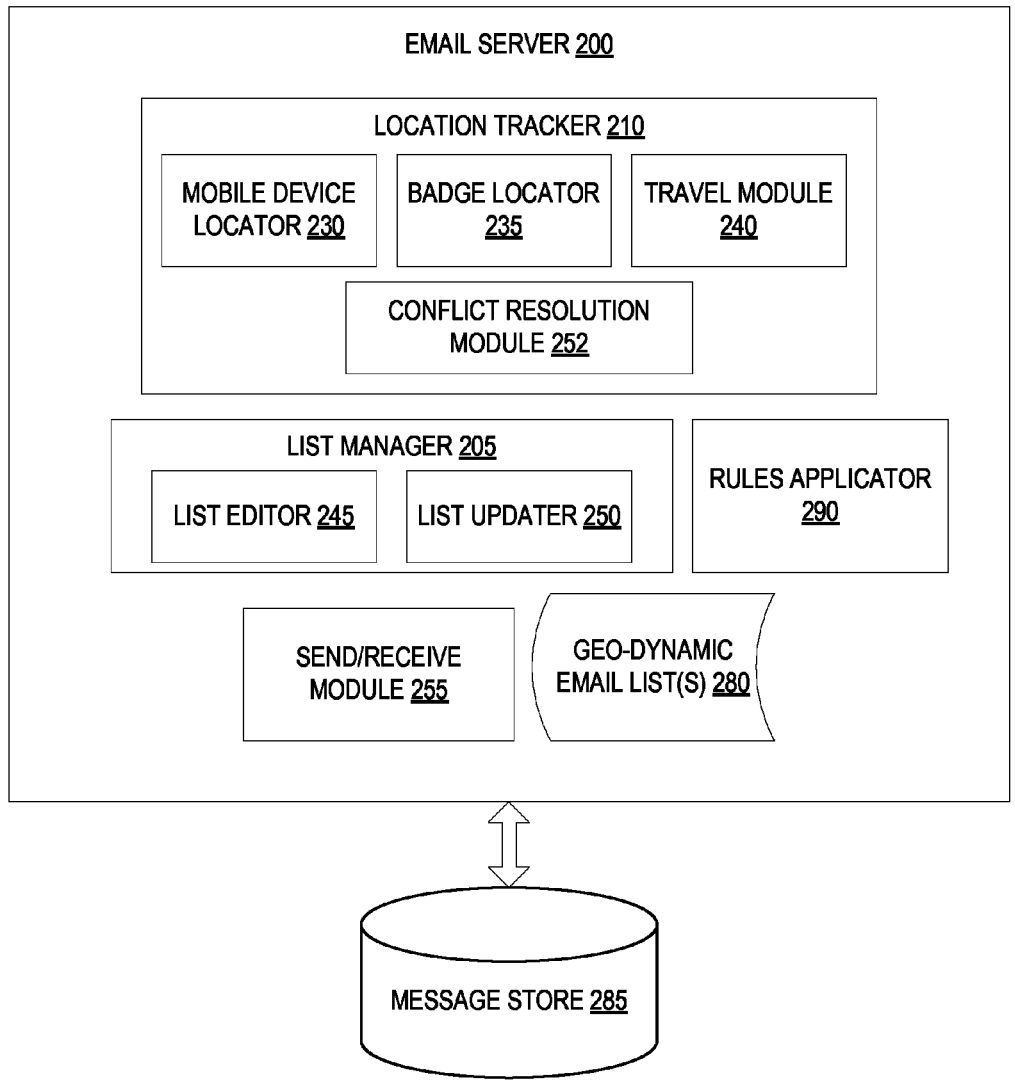
FIG. 2 is a block diagram of one embodiment of an email server.

FIG. 2 is a block diagram of one embodiment of an email server 200, which may correspond to the email server 124 of FIG. 1. In one embodiment, the email server 200 includes a location tracker 210, a list manager 205, a send/receive module 255, a rules applicator 290 and one or more geo-dynamic email lists 280. Note that in alternative embodiments, the functionality of one or more of the location tracker 210, list manager 205, send/receive module 255 and/or rules applicator 290 may be combined. Additionally, the functionality of any of these modules may be subdivided into multiple distinct modules.

Location tracker 210 receives location data from multiple sources, such as mobile computing devices (e.g., mobile phones), users, security systems and/or travel servers. Location tracker 210 may receive the location data periodically or continuously. Additionally, location tracker 210 may receive location data in response to sending queries to location data sources and/or automatically without sending queries to the sources (e.g., when those location data sources have location data to report). Users may also input their locations to location tracker 210.

Location data may be received in multiple different formats. In one embodiment, location tracker 210 includes a separate module for processing each type of location data. For example, location tracker 210 may include a mobile device locator 230 for receiving and processing location data from mobile devices, a badge locator 235 for receiving and processing location data from a security system and a travel module 240 for receiving and processing location data from travel servers (e.g., from airline booking servers).

In one embodiment, mobile device locator 230 receives location data from mobile computing devices in the form of latitude and longitude, country, region, city and/or zip code. The location data may have been derived by mobile computing devices using multilateration (e.g., from cell phone towers), from nearest cell tower locations, using a GPS receiver, based in IP address, etc. In another embodiment, mobile device locator 230 receives location data from mobile computing devices in the form of IP addresses. Mobile device locator 230 may include an IP to GEO determiner (not shown), or may query an IP to GEO directory server to determine a location of a mobile computing device. The determined location may include a country, region and city, latitude and longitude and/or zip code associated with a particular IP address. In one embodiment, in addition to, or instead of, receiving location data from mobile computing devices, mobile device locator 230 receives such location data from a directory service that gathers and stores such data.

Mobile device locator 230 may maintain a data structure (e.g., a directory) that associates mobile computing devices with users and with email addresses of those users. The data structure may include a mobile device identifier field, a user field, an email address field and/or a device location field. When the location of a mobile computing device is determined, that location may be added to an entry in the data structure associated with that mobile computing device (and with a particular user).

In one embodiment, badge locator 235 receives location data from one or multiple security systems. If a company has separate security systems for three different campuses of the company, for example, badge locator 235 may receive location data from those three security systems. The location data may identify a specific security badge scanners that most recently scanned particular security badges. Badge locator 235 may determine locations of users based on the specific security badge scanners that most recently scanned the security badges of those users. In one embodiment, badge locator 235 accesses a data structure that associates security badge scanners with specific locations. The locations may be specific buildings, addresses, zip codes, regions, cities, etc. Accordingly, badge locator 235 may use the data structure to determine a location of a user based on the most recent security badge scanner that detected that user's security badge.

In one embodiment, badge locator 235 maintains a data structure that associates security badges with users. The data structure may include a security badge identifier field, a user field, an email address field and/or a location field. When the location of the user is determined, that location may be added to an entry in the data structure associated with that security badge (and with a particular user).

In one embodiment, travel module 240 receives travel itineraries for users from one or more travel servers. The travel itineraries may specify travel dates as well as destinations. Travel module 240 may determine locations of users based on the travel itineraries. Travel module 240 may maintain a data structure that includes a user field, a location field and a date range field.

In one embodiment, rather than mobile device locator 230, badge locator 235 and travel module 240 maintaining separate data structures, location tracker 210 maintains a single data structure that includes some or all of the above mentioned fields. In one embodiment, the single data structure has a separate field for the locations determined by each of the mobile device locator 230, the badge locator 235 and the travel module 240.

Mobile device locator 230, badge locator 235 and/or travel module 240 may determine different locations for a single user. Accordingly, location tracker 235 may include a conflict resolution module 252 that resolves such conflicting determined locations. In one embodiment, conflict resolution module 252 prioritizes different types of location data. For example, conflict resolution module 252 may prioritize location data from the badge locator 235 above location data from the mobile device locator 230, and may prioritize data from the mobile device locator 230 above data from the travel module 240. Alternatively, other prioritization schemes may be used. For example, location data may be prioritized based on how recent the location data was generated. A user's location may then be determined based on the prioritized location data. In one embodiment, the location data having the highest priority is used to determine a user's location.

List manager 205 creates and maintains geo-dynamic email lists 280. In one embodiment, list manager 205 includes a list editor 245 and a list updater 250. List editor 245 generates new geo-dynamic email lists and edits existing geo-dynamic email lists. List editor 245 may receive a selection of a location or locations to use for a new email list. List editor may additionally receive a request to remove a location from an email list or add a location to an email list. Locations may have varying degrees of granularity. For example, locations may include specific buildings, specific floors or wings of buildings, specific addresses, cities, regions of cities, zip codes, states, countries, and so forth. Additionally, locations may be arranged hierarchically. Therefore, one location (e.g., a corporate campus) may include multiple other locations (e.g., individual buildings on the campus). In another example, a country location may include state locations, each of which may include city locations, and so on.

A single geo-dynamic email list may include multiple different locations of varying degrees of granularity. For example, a single geo-dynamic email list may include the city Seattle and the state Oregon. Additionally, geo-dynamic email lists may be nested. Therefore, in addition to a location, a geo-dynamic email list may include another geo-dynamic email list.

Some examples of geo-dynamic email lists include an "at work employees" list and an "away from work" list. When users are at work, they may be included in the "at work employees" list, and when they leave work (e.g., are over a threshold distance from work) they may be removed from the "at work employees" list and added to the "away from work employees" list. Other examples of geo-dynamic email lists are an "employees travelling abroad" list and an "employees travelling domestically" list. These lists may be used to identify and send email messages to all employees that are travelling domestically and/or abroad.

Note that some geo-dynamic email lists may have static components. For example, a geo-dynamic email list may include a set of email addresses that are included in the list regardless of user location.

Once the scope of a geo-dynamic email list is determined (e.g., the locations and/or other geo-dynamic email lists in a geo-dynamic email list are set), list updater 250 may populate the geo-dynamic email list 280. To populate a geo-dynamic email list, list updater 250 determines those users who are at locations associated with the geo-dynamic email list. The list updater 250 then adds email addresses for those users to the geo-dynamic email list.

In an alternative implementation, a user list is representative of a group of users, and users' email addresses remain in an email list regardless of the users' locations. Accordingly, group membership may not change based on location. However, list configuration information may be changed based on location information. For example, list updater 250 may mark particular group members as being at a specific location associated with a geo-dynamic email list. The marked group members in the list may then be sent emails that are addressed to the geo-dynamic email list.

Send/receive module 255 receives email messages from clients. When an email message is received, send/receive module 255 determines email addresses that the email message is addressed to. If an email message is addressed to a geo-dynamic email list, send/receive module 255 identifies the email addresses that are currently associated with the geo-dynamic email list (or email addresses of users that are at specific locations associated with the geo-dynamic email list) and sends the email message to those identified email addresses. In one embodiment, send/receive module 255 checks, for each group member included in the geo-dynamic email list, whether they are in the right location. If a user is at the right location, the email is sent to the email address of that user. If the user is not at the right location, the email is not delivered to the email address of the user.

In one embodiment, send/receive module 255 stores received messages in a message store 285. Send/receive module 255 may then determine whether any additional email addresses are added to the geo-dynamic email list after receipt of an email message, and send the stored email message addressed to that geo-dynamic email list to those additional email addresses. In one embodiment, send/receive module 255 rechecks membership of a geo-dynamic email list for a set amount of time after an email is received (or from a time from when the email was sent). The email message may be delivered to any additional email addresses that are added to the geo-dynamic email list within that time period. However, after the time period expires, the email message may not be sent to additional email addresses added to the geo-dynamic email list and/or may be deleted.

Some received messages may have an expiration period. For example, a sender sending an email message about an upcoming meeting may set an expiration period so that the message will expire after the meeting is adjourned. The expiration period may be selected by a sender of the message. Send/receive module 255 may automatically delete those messages with expiration periods when the expiration period expires.

In one embodiment, email server 200 includes a rules applicator 290. Rules applicator 290 may include one or more location based messaging rules. As the locations of users change, the location based messaging rules that apply to that user may also change. For example, an encryption strength messaging rule may control the encryption strength used for a message based on the location of the user to which that message will be sent. If the user is in the US, then a strongest encryption strength may be used, but if the user is in Iran, then a weaker encryption strength may be applied. In another example, if the user is not at work (e.g., travelling), then the rules applicator 290 may enable an out of office response. Therefore, out of office responses may be returned to email senders based on a recipient's location. Location based messaging rules may be applied independently of geo-dynamic email lists, or may be associated with geo-dynamic email lists.

FIGS. 3-8 are flow diagrams of various embodiments of methods for generating, updating and using geo-dynamic email lists. The methods are performed by processing logic that may comprise hardware (circuitry, dedicated logic, etc.), software (such as is run on a general purpose computer system or a dedicated machine), or a combination of both. In one embodiment, the methods are performed by an email server, which may include a hardware server machine. In a further embodiment, the methods are performed by a list manager and/or location tracker running on a server machine. Note that the list manager and location tracker may run on the same machine or on separate machines.

Figure 3:
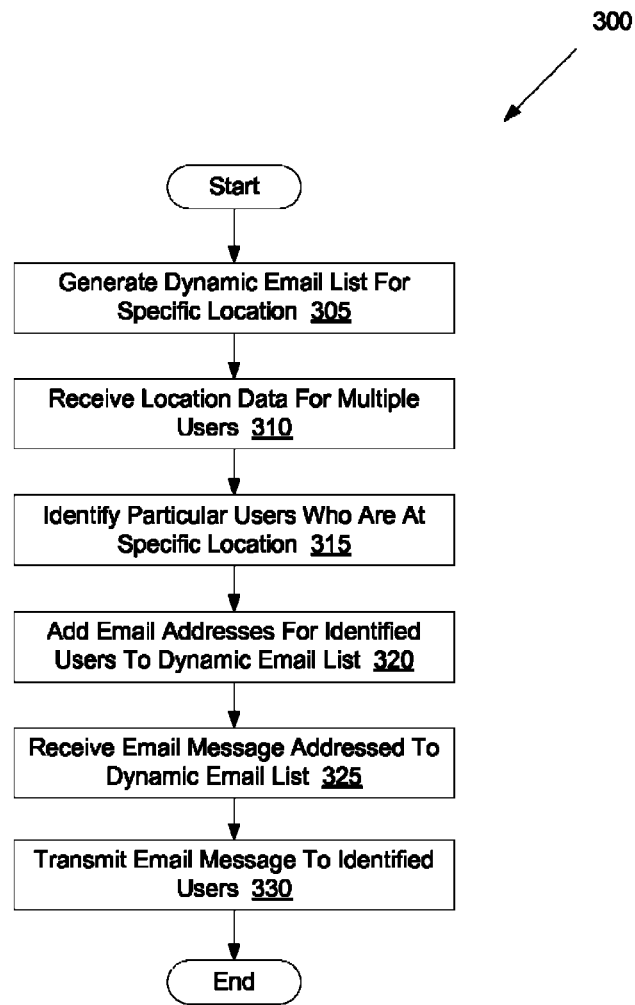
FIG. 3 is a flow diagram of one embodiment for a method of generating and using a geo-dynamic email list.

FIG. 3 is a flow diagram of one embodiment for a method 300 of generating and using a geo-dynamic email list. At block 305 of method 300, processing logic generates a dynamic email list for a specific location. At block 310, processing logic retrieves (or otherwise receives) location data for multiple users. The location data may be retrieved from multiple sources, and may include multiple different types of location data. For example, location data may include IP addresses, latitude and longitude as determined by a GPS receiver in a mobile device, security badge scan data, and so forth.

At block 315, processing logic identifies particular users who are at the specific location associated with the dynamic email list. Processing logic may use the received location data to make such identifications. In one embodiment, processing logic processes the received location data as previously described to determine user locations. At block 320, processing logic adds email addresses for the identified users to the dynamic email list.

At block 325, processing logic receives an email message addressed to the dynamic email list. At block 330, processing logic transmits the email message to the email addresses of the identified users. The method then ends.

Note that in alternative embodiments, the operation of block 320 may be skipped. In such embodiments, the membership of an email list (e.g., the email addresses of users in the email list) may remain unchanged. In such embodiments, at block 330, processing logic transmits the email message to the email addresses of those identified users who are at the location. The email message may be sent to the identified users without sending the email message to other email addresses that are in the email list but that are associated with users who are not at the location.

Figure 4:
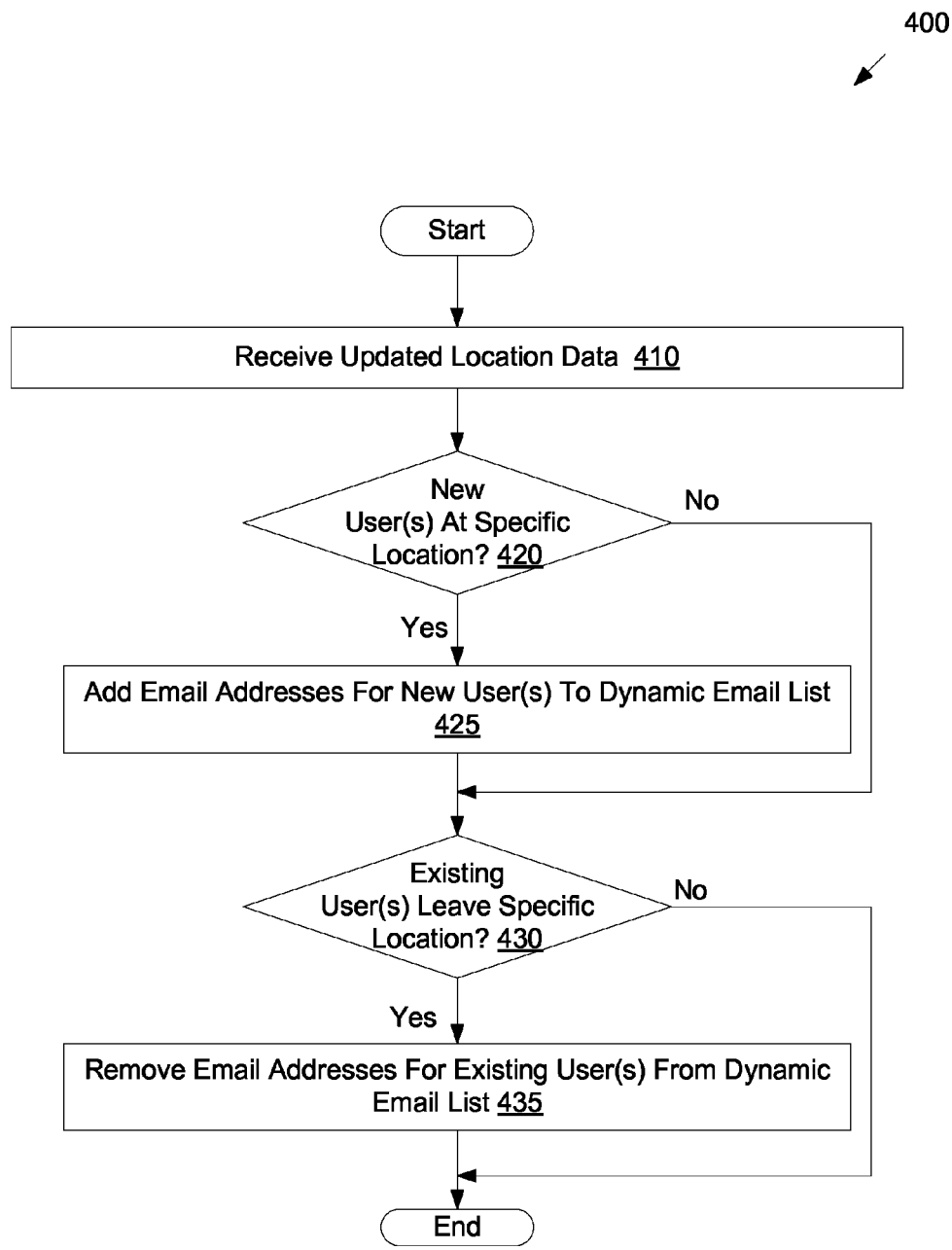
FIG. 4 is a flow diagram of one embodiment for a method of updating a geo-dynamic email list.

FIG. 4 is a flow diagram of one embodiment for a method 400 of updating a geo-dynamic email list. At block 410 of method 400, processing logic receives updated location data after a membership of a dynamic email list has already been determined. Updated location data may be received at a predetermined interval, on a continuous basis, or as new location data is generated by remote sources. At block 420, processing logic determines whether the updated location data indicates that any new users are at a specific location associated with the dynamic email list. If new users are at the specific location, then the method continues to block 425, and email addresses for those new users are added to the dynamic email list. Otherwise, the method proceeds to block 430.

At block 430, processing logic determines whether any existing users have left the specific location associated with the dynamic email list. If any users have left the location, then the method continues to block 435, and processing logic removes the email addresses for those users from the dynamic email list. Otherwise the method ends.

Method 400 may enable geo-dynamic email lists to be continuously and/or automatically updated as location data is received. Accordingly, an email message sent to the dynamic email list at time A may be delivered to a completely different set of email addresses than an email message sent to the dynamic email list at time B.

Figure 5:
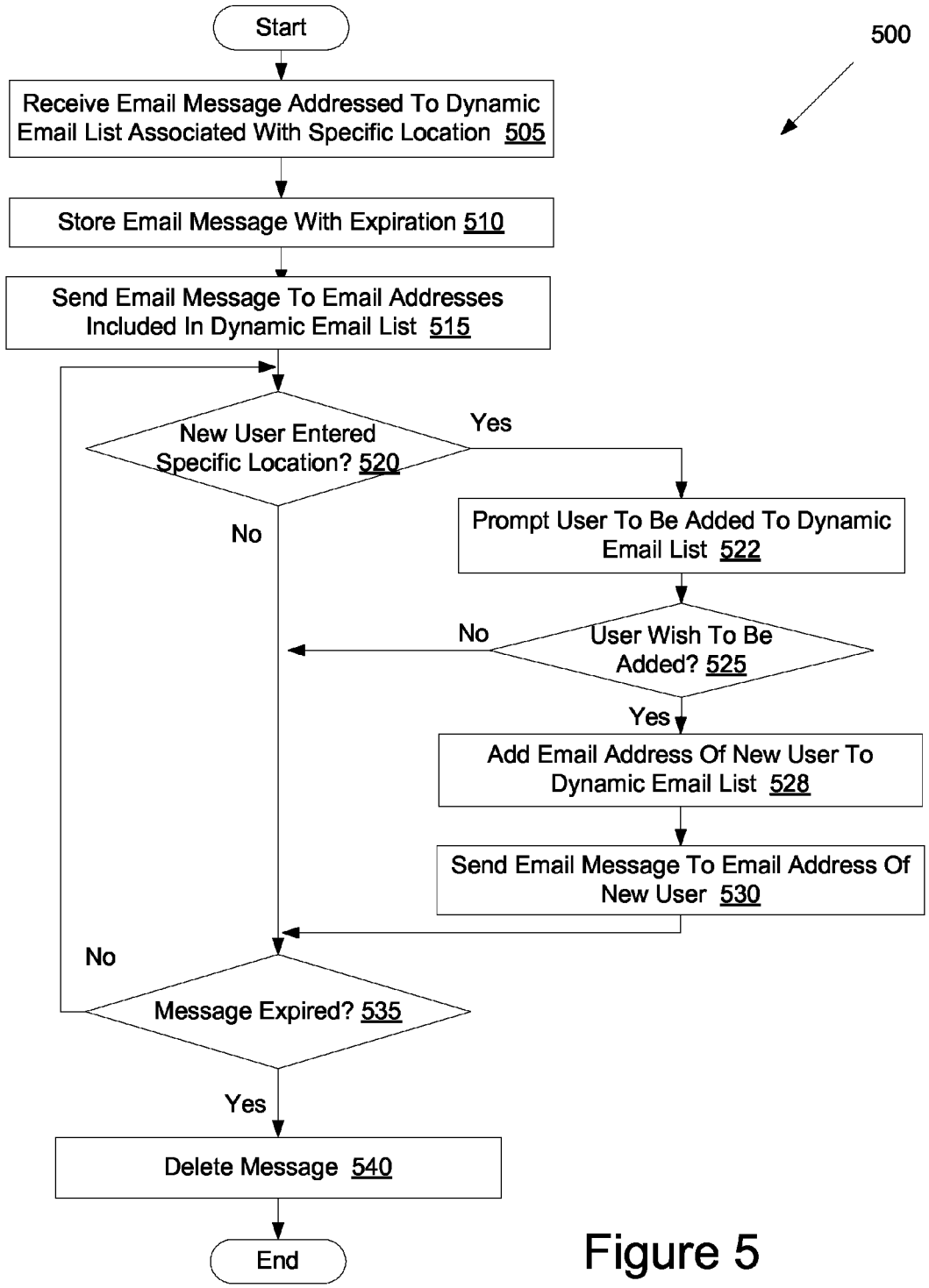
FIG. 5 is a flow diagram of one embodiment for a method of using a geo-dynamic email list.

FIG. 5 is a flow diagram of one embodiment for a method 500 of using a geo-dynamic email list. At block 505 of method 500, processing logic receives an email message addressed to a dynamic email list associated with a specific location. At block 510, processing logic stores the email message along with an expiration period. The expiration period may have been specified in the email message, or may be set by processing logic. In one embodiment, processing logic analyzes contents of the email message to determine an appropriate expiration period. For example, processing logic may search for mention of specific dates and/or times in the email message. If a date and/or time are identified in the email message, then processing logic may set the email message to expire some amount of time after the identified date/time occurs (e.g., 1 hour or 1 day after an identified date/time occurs).

At block 515, processing logic sends the email message to email addresses included in the dynamic email list. Those email addresses may be the email addresses of users who are presently situated at the specific location. At block 520, processing logic determines whether any additional user has entered the specific location. If an additional user has entered the specific location, the method proceeds to block 522. Otherwise, the method continues to block 535.

At block 522, processing logic prompts an additional user who has entered the specific location to select whether or not to be added to the dynamic email list. The user may be prompted via email, via a text message to a mobile phone of the user, or via some other mechanism. Processing logic may receive a response from the user to add the user to the dynamic email list or to exclude the user from the dynamic email list. At block 525, if the user does not wish to be added to the dynamic email list, the method proceeds to block 535. If the user does wish to be added to the dynamic email list, the method continues to block 528.

At block 528, processing logic adds an email address of the additional user to the dynamic email list. At block 530, processing logic sends the stored email message to the email address of the additional user. In one embodiment, blocks 522 and 525 are skipped. In such an embodiment, the email address of the additional user would be added to the dynamic email list at block 528 without prompting the user.

At block 535, processing logic determines whether the message has expired. The message may expire when the expiration period passes. If the message has not expired, the method returns to block 520. If the message has expired, the method continues to block 540. At block 540, processing logic deletes the message. The method then ends.

Figure 6:
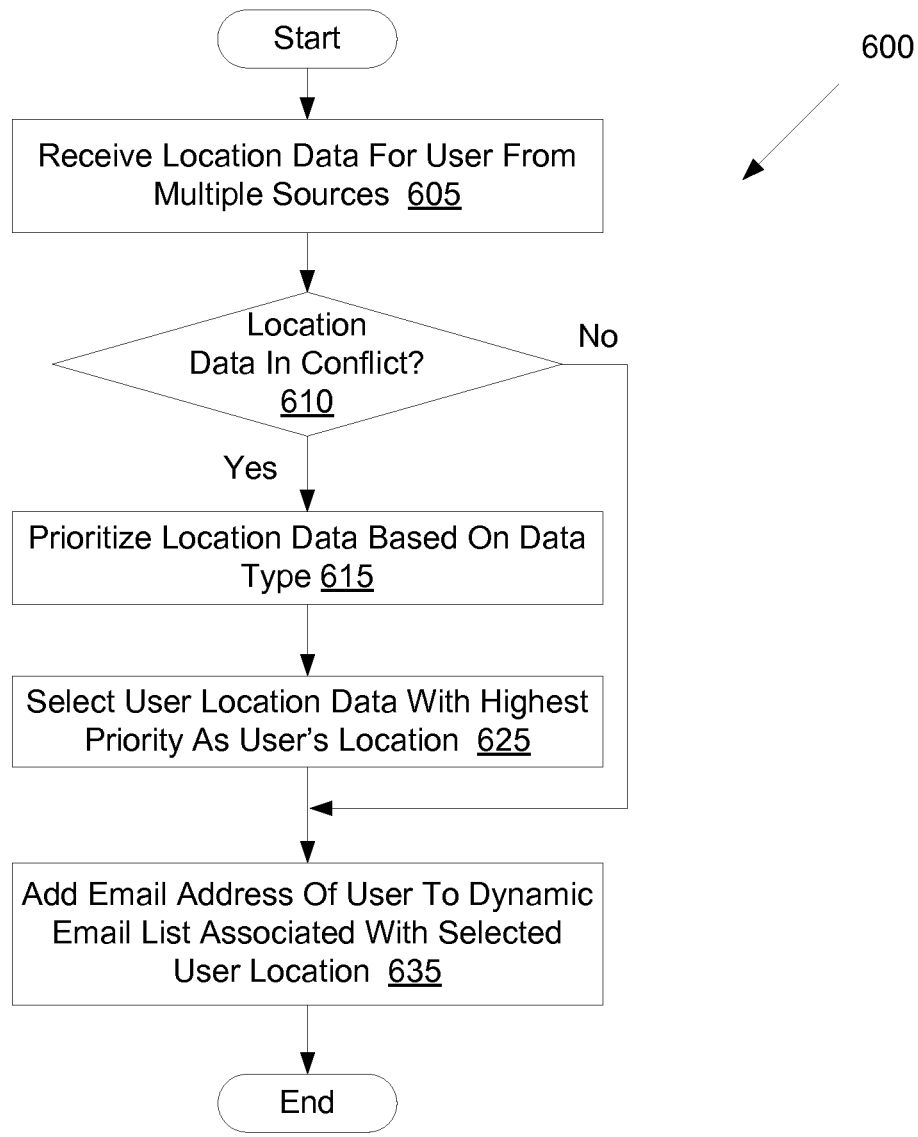
FIG. 6 is a flow diagram of one embodiment for a method of determining a user's location for use in a geo-dynamic email list.

FIG. 6 is a flow diagram of one embodiment for a method 600 of determining a user's location for use in a geo-dynamic email list. At block 605 of method 600, processing logic receives location data for a user from multiple sources. For example, processing logic may receive location data from a mobile computing device of a user, from a travel server and/or from a security system. At block 610, processing logic determines whether any of the location data is in conflict. For example, location data may be in conflict if the security system indicates that the user is located in his office at work, and the user's mobile computing device indicates that the user is at home. If the location data is in conflict, the method continues to block 615. Otherwise the method proceeds to block 635.

At block 615, processing logic prioritizes the location data based on data type (or data source). In one embodiment, location data received from a security system is assigned a highest priority, location data received from a mobile computing device is assigned an intermediate priority, and location data received from a travel server is assigned a lowest priority.

At block 625, processing logic selects the user location data with the highest priority as the user's location. At block 635 processing logic adds the email address of the user to a dynamic email list (or multiple dynamic email lists) associated with the selected user location. The method then ends.

Figure 7:
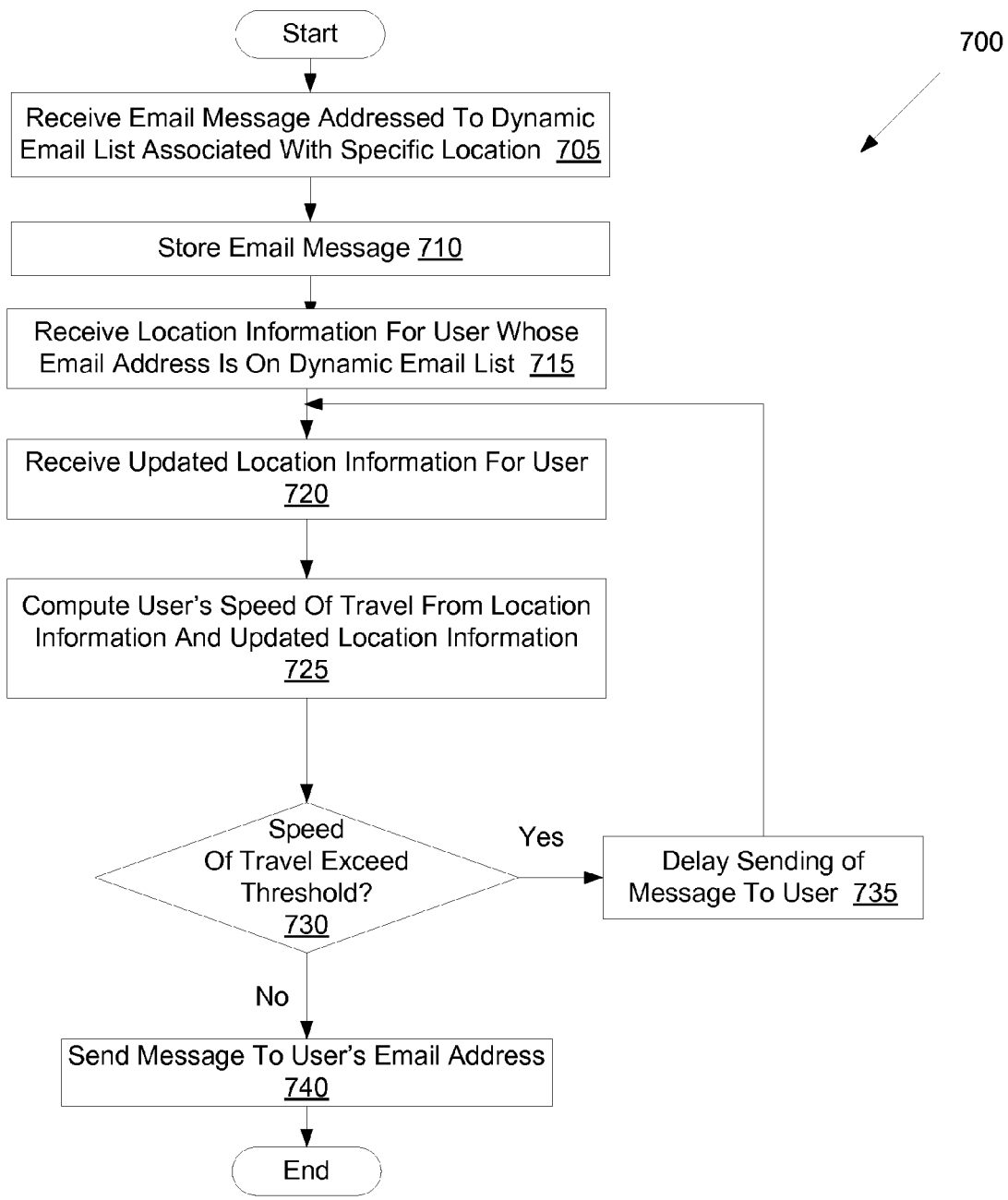
FIG. 7 is a flow diagram of another embodiment for a method of using a geo-dynamic email list.

FIG. 7 is a flow diagram of another embodiment for a method 700 of using a geo-dynamic email list. At block 705 of method 700, processing logic receives an email message addressed to a dynamic email list associated with a specific location. At block 710, processing logic stores the email message. At block 715, processing logic receives location information for a user whose email address is on the dynamic email list. At block 720, processing logic receives updated location information for the user. At block 725, processing logic computes a speed of travel for the user from the location information and the updated location information. The speed may be determined by determining the distance between two user locations and the times at which those locations were recorded.

At block 730, processing logic determines whether the user's speed of travel exceeds a speed threshold. If the user's speed of travel exceeds the speed threshold (e.g., 20 miles an hour), processing logic proceeds to block 735. At block 735, processing logic delays sending the message to the user. Processing logic then returns to block 720. If at block 730 the user's speed of travel does not exceed a speed threshold, the method proceeds to block 740, and processing logic sends the message to the user's email address. Method 700 may prevent messages from being sent to users who are driving, and thus eliminate or reduce a source of distraction for the user and improve driving safety.

Note that method 700 may equally be performed without the use of a dynamic email list. In such an embodiment, processing logic would receive an email message addressed to the user's email address, and then would use received location information for the user to compute the user's speed of travel. Once the user's speed of travel drops below the speed threshold, processing logic could then send the email message to the user's email address.

Embodiments of the Present invention have been described with regards to email lists. However, it should be understood that the embodiments described herein may equally apply to other types of geo-dynamic lists, such as geo-dynamic short message system (SMS) lists, geo-dynamic instant message (IM) lists, and so on.

Figure 8:
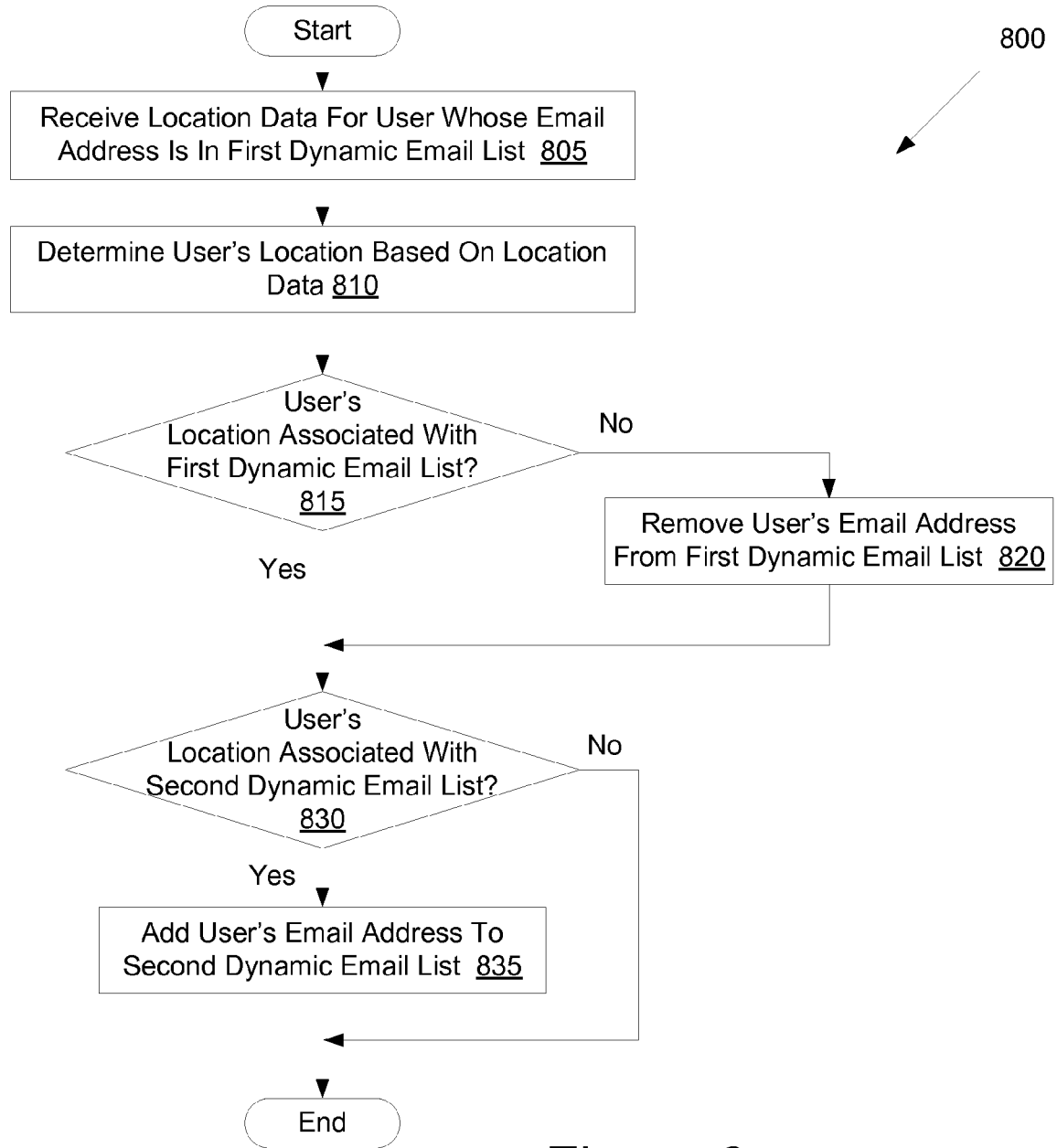
FIG. 8 is a flow diagram of one embodiment for a method of controlling a user's membership in one or more geo-dynamic email lists

FIG. 8 is a flow diagram of one embodiment for a method 800 of controlling a user's membership in one or more geo-dynamic email lists. At block 805 of method 800, processing logic receives location data for a user whose email address is included in a first dynamic email list. The first dynamic email list may be a geo-dynamic email list associated with a first location. The location data may be received from multiple types of sources. At block 810, processing logic determines the user's location based on the received location data.

At block 815, processing determines whether the user's location is associated with the first dynamic email list. If the user's location is associated with the first dynamic email list, then the method continues to block 830. Otherwise, the method proceeds to block 820, and processing logic removes the user's email address from the first dynamic email list.

At block 830, processing determines whether the user's location is associated with a second dynamic email list. The second dynamic email list may be associated with the same location (or locations) that the first dynamic email list is associated with, or may be associated with different locations. If the user's location is associated with the second dynamic email list, the user's email address is added to the second dynamic email list at block 835. Otherwise, the method ends.

Figure 9:
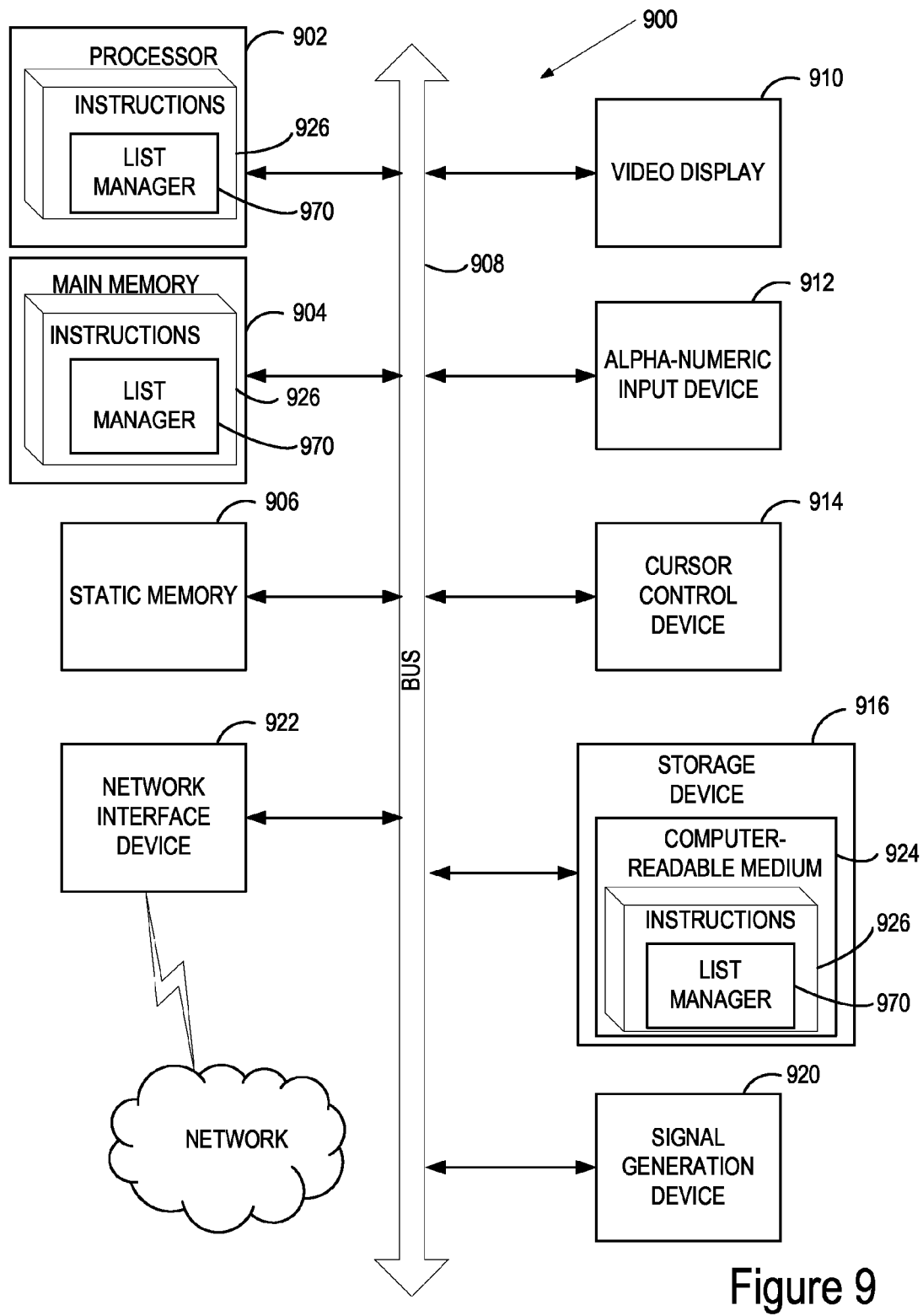
FIG. 9 is a block diagram illustrating an exemplary server computing device.

FIG. 9 is a block diagram illustrating an exemplary server computing device 900. In one embodiment, the server computing device is a component or host of email server 124 of FIG. 1. The server computing device 900 includes a set of instructions for causing the machine to perform any one or more of the methodologies discussed herein. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing system (processor) 902, a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a data storage device 916, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute a list manager 970 and/or a location tracker (not shown) for performing the operations and steps discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 916 may include a computer-readable medium 924 on which is stored one or more sets of instructions 926 (e.g., instructions of list manager 970) embodying any one or more of the methodologies or functions described herein. The list manager 970 may also reside, completely or at least partially, within the main memory 904 and/or within the processor 902 during execution thereof by the computer system 900, the main memory 904 and the processor 902 also constituting computer-readable media.

While the computer-readable medium 924 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating", "identifying", "receiving", "adding", "transmitting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    generating, by a server computing device, an email list associated with a location;
    receiving, by the server computing device, location data for a first user;
    determining, by the server computing device, whether the first user is at the location based on the location data;
    receiving and storing an email message that is addressed to the email list;
    transmitting, in a first transmission, the email message addressed to the email list to a first email address of the first user based on a determination that the first user is at the location;
    setting, by the server computing device without user input, an expiration period for the email message, wherein the expiration period is set based on contents of the email message; and
    responsive to identifying a second user who has entered the location after the first transmission and before the expiration period has expired, transmitting, in a second transmission, the email message to a second email address of the second user.

2. The method of claim 1, further comprising:
    adding the first email address for the first user to the email list or removing the first email address for the first user from the email list based on whether the first user is at the location; and
    transmitting the email message to the first user in response to determining that the email address for the first user has been added to the email list.

3. The method of claim 1, further comprising deleting the email message based on the expiration period.

4. The method of claim 1, wherein the email list is a group email list having email addresses of a plurality of group members, the method further comprising:
    determining group members who are at the location; and
    in response to receiving an additional email message addressed to the email list, transmitting the additional email message to email addresses of those group members who are at the location.

5. The method of claim 1, further comprising:
    receiving updated location data for a plurality of users, wherein the first user is one of the plurality of users;
    identifying at least one of an additional user who is at the location or an existing user who has left the location; and
    modifying the email list by performing at least one of adding an additional email address for the additional user to the email list or removing an existing email address for the existing user from the email list.

6. The method of claim 1, wherein the location data comprises at least one of global positioning system (GPS) data, cell tower triangulation data, internet protocol (IP) address data, security badge scan data, travel itinerary data or data provided by the user.

7. The method of claim 1, further comprising:
    receiving first location data having a first data type and second location data having a second type for the first user;
    identifying a conflict between the first location data and the second location data;
    prioritizing the first location data over the second location data based on the first data type and the second data type; and
    using the first location data for the first user's location.

8. The method of claim 1, further comprising:
    receiving new location data for an additional user who has entered the location;
    prompting the additional user to select whether or not to be added to the email list; and
    in response to receiving a request to add the additional user to the email list, adding an additional email address for the additional user to the email list.

9. The method of claim 1, further comprising:
    receiving periodic location updates for the first user;
    computing a speed of travel for the first user based on the periodic location updates; and
    in response to determining that the speed exceeds a speed threshold, delaying sending of the email message to the first user until the first user slows down below the speed threshold.

10. A non-transitory computer readable storage medium including instructions that, when executed by a processing device, cause the processing device to perform a method comprising:
    receiving, by the processing device, location data for a first user;
    determining, by the processing device, a location of the first user based on the location data;
    receiving and storing an email message that is addressed to an email list associated with a particular location;
    transmitting, in a first transmission, the email message addressed to the email list to a first email address for the first user based on determining that the location of the first user corresponds to the particular location;
    setting, by the processing device without user input, an expiration period for the email message, wherein the expiration period is set based on contents of the email message; and responsive to identifying a second user who has entered the particular location after the first transmission and before the expiration period has expired, transmitting, in a second transmission, the email message to a second email address of the second user.

11. The non-transitory computer readable storage medium of claim 10, wherein the method further comprises:
adding the first email address for the first user to the email list in response to determining that the location of the first user is associated with the email list.

12. The non-transitory computer readable storage medium of claim 10, wherein the method further comprises:
removing the first email address for the first user from an additional email list that is not associated with the location of the first user.

13. The non-transitory computer readable storage medium of claim 10, wherein the email list is a group email list having email addresses of a plurality of group members, and wherein the email list is associated with the particular location, the method further comprising:
determining group members who are at the particular location; and
in response to receiving an email message addressed to the email list, transmitting the email message to email addresses of those group members who are at the particular location.

14. The non-transitory computer readable storage medium of claim 10, the method further comprising:
receiving updated location data for a plurality of users, wherein the first user is one of the plurality of users;
identifying at least one of a particular user who is at the particular location or an existing user who has left the particular location; and
modifying the email list by performing at least one of adding a new email address for the particular user to the email list or removing an existing email address for the existing user from the email list.

15. The non-transitory computer readable storage medium of claim 10, wherein the location data comprises at least one of data received from a mobile computing device, data received from a security system, data received from a travel server or data input by the user.

16. The non-transitory computer readable storage medium of claim 10, the method further comprising:
receiving new location data for an additional user who has entered the location;
prompting the additional user to select whether or not to be added to the email list; and
in response to receiving a request to add the additional user to the second email list, adding an additional email address for the additional user to the second email list.

17. The non-transitory computer readable storage medium of claim 10, the method further comprising:
receiving a new email message addressed to the email list;
receiving periodic location updates for the first user;
computing a speed of travel for the first user based on the periodic location updates; and
in response to determining that the speed exceeds a speed threshold, delaying sending of the email message to the first user until the first user slows down below the speed threshold.

18. A computing system comprising:
a memory to store instructions for an email server; and
a processor coupled to the memory, wherein the processor is configured to:
generate a geo-dynamic email list associated with a location;
receive location data for a plurality of users;
identify a first of the plurality of users who is at the location based on the location data;
receive and store an email message that is addressed to the geo-dynamic email list;
transmit, in a first transmission, the email message addressed to the geo-dynamic email list to a first email address of the first user;
set, without user input and based on contents of the email message, an expiration period for the email message; and
responsive to identifying a second user who has entered the location after the first transmission and before the expiration period has expired, transmit, in a second transmission, the email message to a second email address of the second user.

19. The computing system of claim 18, wherein the processor is further configured to:
add the first email address for the first user to the geo-dynamic email list.

20. The computing system of claim 18, wherein the processor is further configured to:
receive updated location data for the plurality of users;
identify at least one of an additional user who is at the location or an existing user who has left the location; and
modify the geo-dynamic email list by performing at least one of adding an additional email address for the additional user to the email list or removing an existing email address for the existing user from the email list.

21. The computing system of claim 18, wherein the location data comprises at least one of global positioning system (GPS) data, cell tower triangulation data, internet protocol (IP) address data, security badge scan data, travel itinerary data or user provided data.

22. The computing system of claim 18, wherein the geo-dynamic email list is a group email list having email addresses of a plurality of group members, the method further comprising:
determining group members who are at the location; and
in response to receiving an email message addressed to the geo-dynamic email list, transmitting the email message to email addresses of those group members who are at the location.

* * * * *